Oct. 7, 1930.  E. H. REMDE  1,777,476
INDUSTRIAL TRUCK
Filed Aug. 5, 1925  3 Sheets-Sheet 1
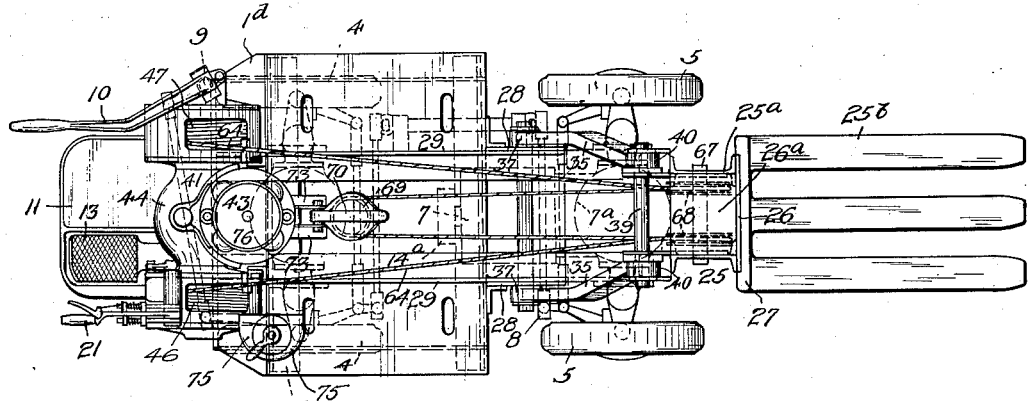
INVENTOR.
Edward H. Remde
BY Edward R. Alexander
ATTORNEY.

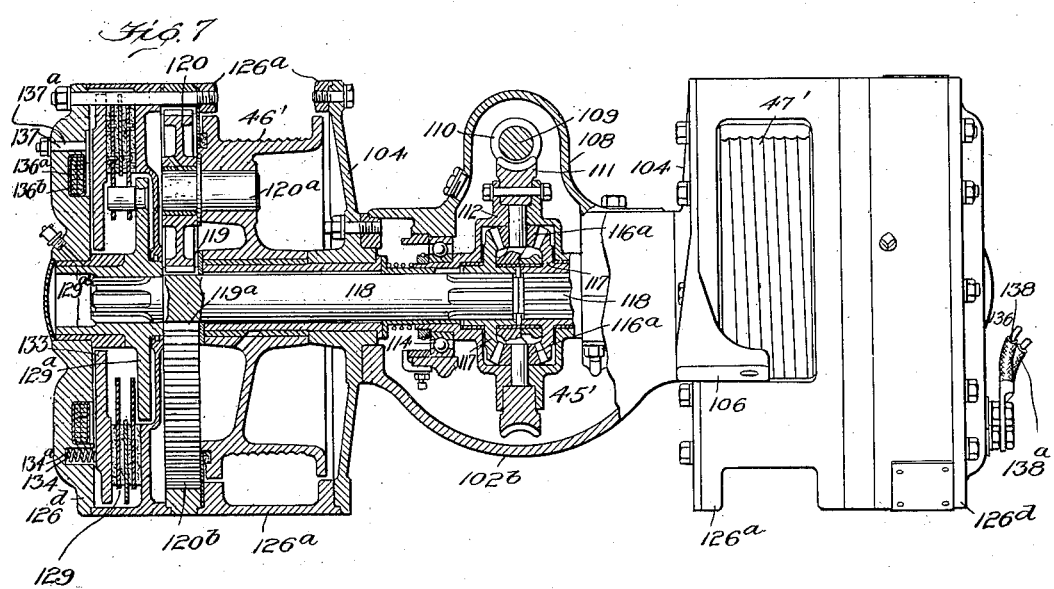

Oct. 7, 1930.  E. H. REMDE  1,777,476
INDUSTRIAL TRUCK
Filed Aug. 5, 1925    3 Sheets-Sheet 3
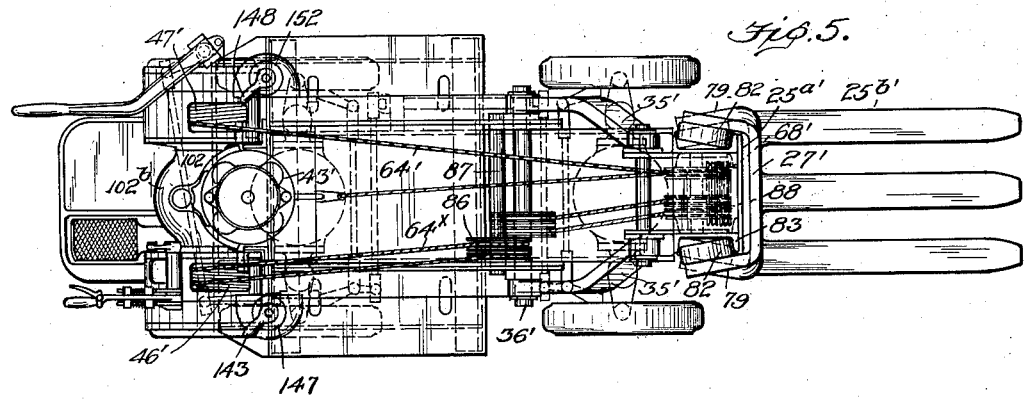
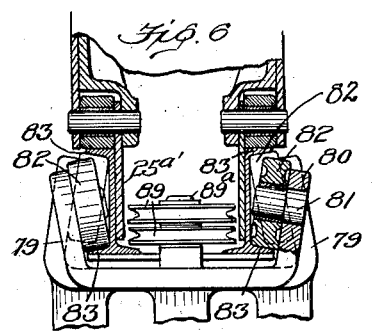
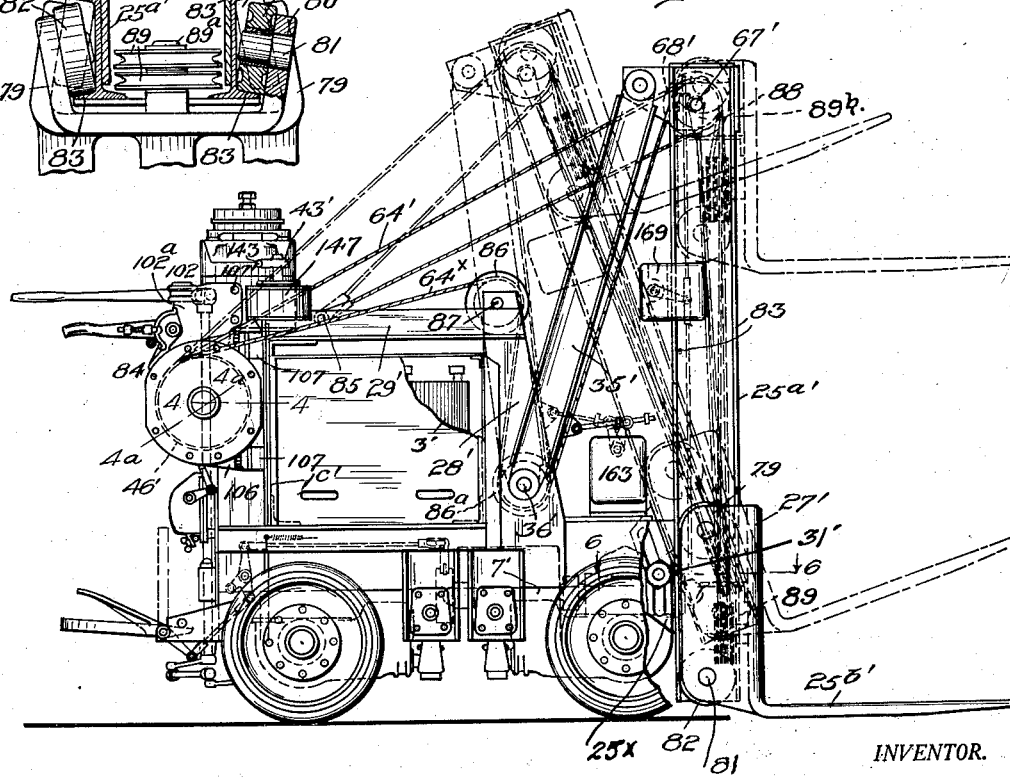
INVENTOR.
BY Edward H. Remde
Edward R. Alexander
ATTORNEY.

Patented Oct. 7, 1930

1,777,476

UNITED STATES PATENT OFFICE

EDWARD H. REMDE, OF CLEVELAND, OHIO, ASSIGNOR TO THE BAKER-RAULANG COMPANY, OF CLEVELAND, OHIO, A CORPORATION OF OHIO

INDUSTRIAL TRUCK

Application filed August 5, 1925. Serial No. 48,421.

This invention relates to an industrial truck capable of lifting, transporting and positioning various kinds and shapes of bodies, for example, rolls of paper, barrels, drums, boxes and the like.

One object of the invention is to provide a truck of this character having a body or load engaging and carrying member and improved means for supporting and moving said member, whereby the body or load to be engaged and transported or positioned is readily handled without undue strain on the truck frame or the engaging and carrying member.

A further object of the invention is to provide a truck of this character having at one end of its frame a body engaging and carrying member and improved means for movably supporting said member, whereby it may be positioned to permit operation of the truck in relatively small areas.

Another object of the invention is to construct an industrial truck having at one end of its frame a load engaging and carrying member mounted to tilt or rock on the truck frame, whereby the load, when elevated, may be shifted to a position over the truck wheels and driving and steering of the truck is facilitated.

A further object of the invention is to construct a truck of the tiering type wherein the vertical guides may be swung inwardly to position the load over or substantially over the adjacent wheels of the truck thereby facilitating the transporting of the load and turning of the truck.

Other objects of the invention will be apparent to those skilled in the art to which my invention relates from the following description taken in connection with the accompanying drawings, wherein Fig. 1 is a top plan view of a truck embodying my invention.

Fig. 2 is a side elevation of the truck.

Fig. 3 is a section on the line 3—3 of Fig. 2.

Fig. 3a is a fragmentary section on the line 3a—3a of Fig. 3.

Fig. 4 is a side elevation of a truck embodying my invention, but in which the construction of the load engaging and carrying member is modified so that the load supporting section thereof may be raised and lowered on the upright section thereof.

Fig. 5 is a top plan view of the parts shown in Fig. 4.

Fig. 6 is a fragmentary section on the line 6—6 of Fig. 4.

Fig. 7 is a view of the power unit used in the form of construction shown in Figs. 4 and 5, partly on the line 4—4 and partly on the line 4a—4a of Fig. 4.

In the drawings, 1 indicates a frame of any desired shape and form, preferably constructed from members, such as angle bars, suitably connected by rivets or otherwise. The frame may comprise a pair of longitudinal members 1a, and a pair of upright members 1c secured to the members 1a at or adjacent one end thereof, to wit, the driving end of the truck. 2 indicates a suitable casing enclosing the source of power supply, to wit, storage batteries 3, preferably arranged near or adjacent the driving end of the frame so that the weight of the batteries may be utilized to counterbalance loads at the other end of the frame. 4, 5, indicate pairs of wheels for supporting the frame 1, preferably of the same size and connected to the frame by suspension mechanisms 6, described and claimed in a co-pending application Ser. No. 420,630 jointly filed by John H. Hertner and myself (see Letters Patent 1,628,145), to which reference may be made. Either or both pairs of wheels may be driven as desired. In the present form of construction, as shown in Fig. 1 of the drawings, only one pair of wheels (those designated at 5) are driven. For this purpose I provide an electric motor 7 connected through a suitable power transmission in a housing 7a to the axle sections for the wheels 5; and by preference both pairs of wheels are steered simultaneously by connections, indicated as an entirety at 8, which connections are connected to and operated by a steering column 9, having an operating handle 10.

11 indicates a support on which the operative stands while operating the truck and the load supporting and engaging member in the manner to be later described. 13 indicates a foot pedal associated with the platform 11, and arranged to control the release and application of a brake mechanism, indicated as an entirety at 14.

The brake mechanism 14 is arranged to brake the movement of the truck or to hold it against movement, its operating elements being so arranged and connected to a suitable spring 15 that the latter normally acts to apply the brake and to swing the pedal 13 upwardly, as shown in Fig. 2. The brake mechanism 14 is preferably constructed to act on an element driven directly by the motor, in which arrangement the brake elements engage a band wheel 14$^a$ fixed to an extended end of the motor shaft. The brake elements are connected to a rod 16, to which the spring 15 is connected. The rod 16 is operatively connected to the pedal 13 by a bell crank and link 17.

18 indicates as an entirety a controller for cutting in or closing the circuit to the motor 7 to operate it at different speeds and in opposite directions, in a well known manner. The controller is connected by the operating elements 19—20—20$^a$ to an operating lever 21. 23 indicates as an entirety a switch mechanism associated with the controller 18 and brake mechanism 14, and automatically controlled by the latter through a rod (not shown) to break the circuit to the controller or to the motor when the brake is on (that is, the brake shoes are operated by the spring 15) and to close the circuit when the brake is released (that is, the foot pedal 13 is pushed downwardly), the purpose being to prevent operation of the motor 7 by means of the controller if the latter is moved from its "off" position in either direction when the brake is in its applied position. By preference, the switch mechanism is interconnected with the controller to prevent closing of the circuit in the event the controller lever is in or is moved to an "on" position and attempt is made to release the brake. As this mechanism is described and claimed in Letters Patent No. 1.620,167, dated March 8, 1927, further description thereof is thought to be unnecessary.

25 indicates as an entirety a tiltable load engaging and carrying member arranged at that end of the frame 1 opposite to the platform 11. The member 25 comprises a main or upright section 25$^a$ and a load supporting element 25$^b$; by preference the element 25$^b$ extends at substantially right angles to the main section and in the form of construction shown in Figs. 1, 2, and 3, it is rigidly secured to the lower end thereof. The main section 25$^a$ extends downwardly below the frame 1 so that the load supporting section may be readily positioned below the load to be lifted or tilted; it may extend upwardly any desired distance so as to accommodate bodies that are relatively high and also to provide for long leverage about the fulcrum on which the section 25$^a$ tilts, whereby its operation may be readily effected without undue stress upon the frame or damage to the hoisting mechanism to be later described. The main section 25$^a$ preferably comprises a pair of I-beams disposed parallel to each other and held in such relationship by tie plates 26. 26$^a$, at their upper ends and at their lower ends by a plate 27 to which the tynes constituting the illustrated load supporting section 25$^b$ are connected. The plate 26$^a$ is preferably secured to the I-beams by angles 26$^b$ (Fig. 2).

The supporting means for the tiltable member 25 comprises the following: 28 indicates a pair of plates rigidly secured at their lower ends to the angle members 1$^a$ and extending upwardly to a point above the casing 2. 29 indicates a pair of angle bars extending horizontally above the casing 2 and rigidly connected at their front ends to the uprights 1$^c$ and at their rear ends to the upper ends of the plates 28. 30 indicates a pair of brackets, each connected to one of the frame members 1$^a$, and disposed on the inner face thereof. Each bracket 30 is formed with a recess 30$^a$ to receive a roller 31 loosely mounted on a shaft 32. One end of the shaft 32 is mounted in an opening formed in the side wall 33 of the recess and the opposite end of the shaft 32 is mounted in an opening formed in the frame member 1$^a$, which forms the other side wall of the recess 30$^a$. As will be understood from Fig. 3, the rollers 31 are disposed in position to form a bearing, guide or track as well as a pivot or fulcrum for the I-beams 25$^a$, as they are moved upwardly and rearwardly, to lift and tilt the load, as will later appear. 25$^x$ indicates a plate carried by each I-beam 25$^a$. As shown in Fig. 3 (also Fig. 6), this plate extends to a point between the side wall 33 and adjacent roller and is formed with an elongated slot 25$^{x'}$ through which the shaft 32 for the roller 31 extends, so that through the engagement of the walls of the slot and shaft the I-beams will be maintained in engagement with the rollers during their movement. The plates 25$^x$ also serve to prevent lateral movement of the upright section at its lower portion. 35 indicates a pair of links pivotally connected at their lower ends to some portion of the frame inward of the member 25 and at their upper ends pivotally connected to the upper portion of the load engaging and carrying member 25. In the illustrated form of construction I (1) form aligned openings in the plates 28 and support therein a pin 36, the ends of which project beyond the plates 28 and into and through knuckles 37 on the lower ends of the links 35; and (2) provide a pair of inwardly extending brackets 38 at the upper ends of the I-beams 25$^a$ and form therein openings to receive a pin 39, the opposite ends of which extend into and through knuckles 40 formed on the upper ends of the links 35. As shown in Fig. 1, the links 35 are bent inwardly between their ends so that the knuckles 37 will be disposed on the outer sides of the plates 28 and the knuckles 40 will be disposed on the outer sides of and against the brackets 38. This form of construction also tends to brace the upper ends of the I-beams against lateral swaying.

From Fig. 2, it will be noted that when the load engaging and carrying member 25 is in position to engage or discharge a load; that is, the supporting section 25$^b$ is parallel to the surface or floor so that operation of the truck on its wheels will move such section into position below a load or in the reverse direction from beneath a load, the links 35 are inclined upwardly and outwardly in the plane of the truck; accordingly, the application of a pull on the upper end of the main section 25$^a$ will swing the links 35 inwardly about the pin or shaft 36 (see dotted lines in Fig. 2), the effect of which will be to raise and tilt the load engaging and carrying member 25. As shown, the load engaging and carrying member 25 is disposed relatively close to the wheels 5, so that when it is raised and tilted, the load thereon will be shifted to a position substantially over these wheels.

The pull on the member 25 above referred to is effected by a mechanism preferably comprising the following instrumentalities: 41 indicates as an entirety a casting shaped and constructed to form a cradle 42 for a motor 43 and a housing section 44 for a suitable power transmitting mechanism, the casting having feet each of which is secured to an angle 51 carried by the adjacent upright member 1$^c$ to support the motor 43 and power transmitting mechanism upon the latter. The power transmitting mechanism is driven by the motor 43 and drives two shafts 62 (only one being shown), which are in turn connected with a pair of drums 46, 47, on which a pair of flexible members 64 simultaneously wind or unwind.

The cables 64 are preferably formed from a single section of cable which is operatively connected to the load engaging and carrying member 25 to effect pull thereon preferably as follows: 67 indicates a shaft mounted at its opposite ends in openings formed in the I-beams of the main section 25$^a$. 68 indicates sheaves mounted on the shaft 67. 69 indicates a sheave mounted in a block 70, preferably swingably mounted on the frame to accommodate itself to the position of the cables. The cable from one drum extends to and around one of the sheaves 68 then to and around the sheave 69 and then to and around the other sheave 68, from which it extends to the other drum. From the foregoing description it will be seen that both drums operate together in either direction, both ends of the cable section are simultaneously wound on or off the drums and the pull on the cable ends is equalized. Accordingly, (1) the pull exerted by both drums on the upper end of the main section 25$^a$ and transmitted through the sheaves 68 will be equal at all times, thereby eliminating danger of twisting the links 35 or causing undue friction between the ends of the links and the shafts forming the pivot connections therefor and (2) the leverage is reduced. I preferably provide between the driven shaft sections and the drums speed reduction gearing so that the motor may exert maximum torque with a minimum consumption of current.

75 indicates a controller for the motor 43. 76 indicates a wheel fixed to the upper extended end of the shaft for the motor 43, the wheel being adapted to serve as a wheel for a suitable brake mechanism (not shown) preferably controlled by a solenoid having its winding connected in series with the motor.

78 indicates a limit switch mechanism preferably connected to one of the links 35 and serving to cut off current to the motor 43 when it reaches a predetermined position in its movement in either direction.

The load supporting member 25$^b$ shown herein is adapted to be projected below a load when supported on a skid, bars or otherwise in elevated position, for which purpose it consists of one or more flat arms or tynes; but if desired it may be otherwise constructed or shaped according to the construction of the bodies to be engaged and lifted.

Referring to Figs. 4, 5, 6 and 7, I have shown a slightly modified form of construction, wherein the load supporting section of the load engaging and carrying member is movable along or slidably engages the main section thereof, for which purpose the latter is provided with guides, and the cable winding drums are rotated independently in either direction in any desired manner (preferably by means of a single motor and power transmitting mechanism, as hereinafter described), so that the main section may be tilted or the supporting section raised or lowered. As a result of this form of construction, the truck may be used for carrying out additional operations, such as tiering loads, the load may be adjusted along the main section to so position its center of gravity that driving of the truck may be facilitated and the supporting section, either with or without a load may be positioned so that the total length of the truck will be shortened, in order that it may occupy less floor space and be turned in a relatively small area as well as to clear obstructions which would otherwise prevent manipulation of the truck.

In these views 25$^{b'}$ indicates the supporting section having a body portion 27' to which the supporting arms or tynes may be integrally connected. The body portion 27' has extended sides 79 formed with openings 80 in which stud shafts 81 are mounted. The stud shafts 81 loosely carry rollers 82 which engage the inner faces of the webs 83 of the I-beams constituting the main section 25$^{a'}$, whereby these webs serve as guides to slidably support the section 25$^{b'}$ thereon. As shown, the lower rollers 82 on the sides 79 engage the rear guides 83 and the upper rollers 82 engage the front guides. As these guides are inclined opposite to each other and it is desirable to position each roller shaft 81 parallel to the guide with which its roller engages, each side 79 is twisted at its central portion so that its opposite ends will be at right angles to the planes of the adjacent webs 83 (see Fig. 6).

The power mechanism for swinging or tilting the load engaging and carrying member or for moving the supporting section 25$^{b'}$ in either direction relative to the main section 25$^{a'}$ is indicated as an entirety at 84. Of this mechanism, 102 indicates a casting shaped and constructed to form a cradle 102$^{a}$ for a motor 43' and a housing section 102$^{b}$ for the power transmitting mechanism 45'. 104 indicates supporting disks or members suitably secured to the end walls of the housing section and having feet 106, each of which is secured to an angle 107 carried by the adjacent upright member 1$^{c'}$. The feet 106 operate through the disks or members 104 and the housing and cradle casting 102 to support the motor 43' and power transmitting mechanism upon the frame members 1$^{c'}$. 108 indicates a housing section enclosing the worm shaft 109, the worm thereon being arranged to mesh with and drive the gear 111 of the power transmitting mechanism 45'. The mechanism 45' is preferably of the differential type and comprises the main gear or worm gear 111 having a casing 112 carrying pinions 116$^{a}$ in mesh with bevel gears 117 to drive them. 118 indicates axle sections splined in a well known manner at their inner ends to the hubs of the bevel gears 117. Each of the axle sections 118 at its outer end is connected by a reduction gearing, indicated as an entirety at 119, with the adjacent drum 46' or 47' to rotate it in one direction or the other to wind a cable 64' or 64$^{x}$ thereon or permit unwinding therefrom according to the direction of rotation of the motor 43'.

Each reduction gearing 119 comprises a pinion 119$^{a}$ carried by the adjacent shaft section 118 and meshing with gears 120 rotatably mounted in a suitable manner on the outer side of the drum 46', but eccentrically to its axis, the shafts 120$^{a}$ for the gears being preferably arranged in diametrical relation. The gears 120 mesh at their outer portions with an internal ring gear 120$^{b}$ which is stationary, being connected to the adjacent disk 104 through the casing member 126$^{a}$, so that when the shaft section 118 is driven the gears 120 are rotated on their axes and also caused to revolve about the axis of the shaft section, thereby rotating the adjacent drum at a speed the rate of which is lower than the rate of speed of the shaft section—the ratio in the disclosed construction being substantially eight and one-half to one.

As will be understood, both drums 46', 47', are operatively connected through the reduction gearings 119, shaft sections 118 and differential mechanism 45' with the motor 43'. Accordingly, by locking (by means of a locking or holding means) one of the driven elements at either side of the differential mechanism 45', the drum associated therewith will be held against movement and the power of the motor 43', when set in operation, will be transmitted through the differential mechanism, the other shaft section and the adjacent reduction gearing 119 to rotate the drum connected to the latter, so that either drum may be rotated as may be desired.

In the illustrated form of construction each locking or holding means is constructed to normally lock the adjacent drum or its driving means, so that both drums are normally held against movement. As a result of this arrangement, I provide and associate with each of the locking or holding means releasing means (indicated as an entirety at 136) either of which may be operated, at will, by a selective mechanism so that either drum may be operated when the motor 43' is driven.

Each locking or holding means comprises a multi-disk clutch indicated as an entirety at 129. Certain of the clutch disks are carried by a rotor 129$^{a}$ and the others thereof are carried by the casing 126$^{a}$, but are mounted for relative movement to effect an unclutching or clutching relation. The outer disk 133 is preferably in the form of an annular member and formed of soft iron to constitute an armature for a purpose which will later appear. The disks are normally maintained in clutching relation by a plurality of expansion springs 134 mounted in recesses 134$^{a}$ formed in the inner face of the casing element 126$^{d}$ and normally acting against the annular member 133. The releasing means 136 for releasing the clutch and disconnecting each drum from the adjacent locking and holding means 129, is preferably of the magnetic type, in which event the annular member 133 forms one magnetic element of such means— for example, the armature as already set forth; the other element thereof comprises a winding 136$^{a}$ (preferably of substantially annular shape) fitting a recess 136$^{b}$, formed in the inner face of the casing element 126$^{d}$. The winding 136$^{a}$ may be held in the recess 136$^{b}$ by headed bolts 137 mounted in openings 137$^{a}$ formed in the casing member 126$^{d}$, the heads of the bolts overlapping the winding 136ª to hold it in the recess 136ᵇ, as well as serving as a spacer between the winding 136ª and armature 133 to maintain an air space between them and thus insure the release of the armature 133 from the winding following the de-energizing thereof. 138, 138ª, indicate the terminals for the winding 136ª connected by leads to the batteries 3' in the manner to be later set forth.

It will be understood from the foregoing description that the clutch disks of both clutches 129 are normally held in clutching relation by the springs 134 and operate to lock both shaft sections 118 and both drums 46', 47', against rotative movement, and that either clutch may be released by selectively operating the magnetic means 136 by a selective mechanism, whereupon one of the drums will be operated upon the closing of the circuit to the motor 43'. I provide for this selective operation of either drum by a single motor by utilizing a differential mechanism to drive the drum shafts and taking advantage of the well known principle inherent in such mechanism. By operating one of the clutches 129 to release the adjacent drum by the magnetic means 136, I connect the latter in series with the motor 43', so that operation of such means will only take place upon the closing of the circuit to the motor.

The circuits for the coils 136ª and the selective control devices therefor are arranged so that either coil may be connected in series with the motor, whereby the operation of the controller to drive the motor 43' in either direction will simultaneously effect the operation of either releasing means and the unlocking of the clutch acted on thereby to permit operation of the adjacent driving means. As a result either drum 46', 47', may be rotated in one direction or the other to raise and tilt the main section 25ª' about the rollers 31' or to raise or lower the load engaging device 25ᵇ' as desired. To carry out these operations, I provide a lever 143 which is connected to a controller 147 to supply current to the motor 43' and a lever 148 connected to a switch device 152, the purpose of which is to select or connect either one of the coils 136ª in series with the motor 43', so that upon the operation of the controller lever 143, the selected drum will be rotated in one direction or the other, according to the direction of movement of the lever.

The selector lever 148 is shown in a neutral position in Fig. 5, that is, that position in which neither coil 136ª is connected in the circuit of the motor and batteries, but my movement of the lever to the right or left, one of the coils may be connected in the circuit as already described. This arrangement insures the complete cutting of current out of one coil and its de-energization before the other coil can be connected to it.

In this form of construction the cable 64' leads from the drum 47' to and around a sheave 68' on the shaft 67', its opposite end being connected to an anchor 85 comprising a rod secured in any desired manner to the bars 29'. Accordingly rotation of the drum 47' in one direction will swing the links 35' inwardly and thus raise and tilt the main section 25ª' as shown in dotted lines in Fig. 4; paying out of the cable 64' permits movement of the links 35' and section 25ª' in the opposite direction. For raising and lowering the supporting section 25ᵇ', I preferably provide two cables 64ˣ which simultaneously wind on and off the drum 46'. From this drum these cables run around sheaves 86 loosely mounted on a shaft 87 supported at the upper ends of the plates 28', then around sheaves 86ª loosely mounted on the pivot pin 36' for the links 35', then around sheaves 88 mounted on the shaft 67' and then around sheaves 89 loosely mounted on a shaft 89ª which is supported by the body portion 27' (see Fig. 6); from the sheaves 89 the cables extend upwardly and are connected to anchors 89ᵇ supported by the shaft 67'.

As will be understood from the foregoing description, the load is raised and lowered by winding the cables or ropes 64ˣ on or unwinding them from the drum 46' and the section 25ª' is tilted by winding the cable or rope 64' on or unwinding it from the drum 47'. The movement of each of these elements is automatically stopped when moved in either direction at a predetermined position by a mechanism which opens the circuit to the motor that operates such element. The mechanism for stopping the swinging or rotation of the section 25ª' is indicated as an entirety at 163; and the mechanism for stopping the raising and lowering of the load is indicated as an entirety at 169. The switch means of these mechanisms forms the subject-matter of a co-pending application Serial No. 610,-791, (see Letters Patent No. 1,726,717) for which reason they are not more fully illustrated and described herein.

To those skilled in the art to which my invention relates many alterations in construction and widely differing embodiments will suggest themselves without departing from the spirit and scope thereof. The disclosures and the description herein are purely illustrative and are not intended to be in any sense limiting.

The current for the motors 7' and 43' and for the coils for the magnetic lock and release means is supplied from the batteries 3'. I have not shown herein the circuits and connections between the batteries and the controllers and selector switch mechanism, since the same is fully disclosed in my co-pending application Serial No. 749,141, to which reference may be made.

What I claim is:

1. In apparatus of the class described, the combination with a frame and wheels for supporting said frame, of a load carrying member having an upright portion, co-acting guide elements between said frame and the lower end of said portion permitting the latter to slide and pivot on said frame, a link pivotally connected at one end to said frame inwardly of said guide elements and pivotally connected at its upper end to the upper end of said upright portion and operating to support said member on said frame, means connected to the upper end of said upright portion for swinging said link inwardly about its pivotal connection with said frame, whereby said load carrying member is bodily raised and tilted, and interlocking devices between said frame and upright portion for maintaining said guide elements in engagement during the bodily movement of said load carrying member.

2. In apparatus of the class described, the combination with a frame and wheels for supporting said frame, of a tiltable load engaging and carrying member comprising an upright section having guides and a supporting device slidably engaging said guides, a link swingably mounted on said frame inwardly of said upright section and pivotally connected to the upper portion of the latter and arranged to support said section and to bodily raise it and swing its upper end inwardly and outwardly when operated, and a power mechanism including flexible members having operative connections with said supporting device and upright section, respectively, serving to raise said supporting device and to swing said link about its pivotal mounting.

3. In apparatus of the class described, the combination with a frame and wheels for supporting said frame, of a tiltable load engaging and carrying member comprising an upright section slidably and pivotally engaging said frame at its lower portion and having guides and a supporting section slidably engaging said guides, a link for swingably supporting said member, said link being pivotally mounted at its lower end on said frame and pivotally connected at its upper end to the upper portion of said member and serving, when operated about its pivotal mounting, to raise and inwardly tilt said member, a power mechanism comprising a motor, a pair of drums, transmission means between said motor and said drums and selective means for controlling the operation of either drum and locking the other drum, and flexible members arranged to wind on and off said drums and operatively connected to said upright section and supporting section.

4. In apparatus of the class described, the combination with a frame and wheels for supporting said frame, of a tiltable load engaging and carrying member comprising an upright section slidably and pivotally engaging said frame at its lower portion and having guides and a supporting section slidably engaging said guides, a link pivotally connected to said frame on an axis inwardly of said member and connected at its upper end to the upper portion of said upright section and arranged to swing about its pivot to bodily raise and tilt said upright section; a pair of drums, means for driving either of said drums, a flexible member arranged to wind on and off one of said drums and operatively connected to said supporting section, and a flexible member arranged to wind on and off the other drum and operatively connected to said upright section for tilting it.

5. In apparatus of the class described, the combination with a frame and wheels for supporting said frame, of a tiltable load engaging and carrying member comprising an upright section having guides and a supporting section slidably engaging said guides, a link for supporting said member pivotally connected to said frame on an axis inwardly of said member, drums on said frame, a sheave disposed at the upper end of said upright section, a sheave mounted on an axis coincident with the axis of the pivot connection between said link and said frame, a flexible member arranged to wind on and off one of said drums and running around said sheaves and operatively connected to said supporting section, and a flexible member arranged to wind on and off the other drum and operatively connected to said upright section for tilting it.

6. In apparatus of the class described, the combination with a frame and wheels for supporting said frame, of a tiltable load engaging and carrying member comprising an upright section slidably and pivotally engaging said frame at its lower portion and having guides and a supporting section slidably engaging said guides, a link pivotally connected at its lower end to said frame on an axis inwardly of said member and at its upper end connected to the upper portion of said upright section and arranged to bodily raise the latter and swing its upper portion inwardly, and mechanism for raising and lowering said supporting section relative to said upright section and for tilting said load engaging and carrying member.

7. In apparatus of the class described, the combination with a frame and wheels for supporting said frame, of a tiltable load engaging and carrying member comprising an upright section and a supporting section, a member pivotally connected to said frame on an axis inwardly of said load engaging and carrying member and arranged to support it on said frame, means connected to one of said members for swinging said supporting member inwardly, whereby said load engaging and carrying member is raised and the upper end of its upright section is swung inwardly, spaced guide rollers on said frame for the lower end of said upright section, and a pair of plates carried by said upright section formed with elongated slots through which the shafts of said rollers project to maintain said upright section in engagement therewith during its movement upwardly and downwardly.

8. In apparatus of the class described, the combination with a frame and wheels for supporting said frame, of a tiltable load engaging and carrying member comprising an upright section and a supporting section, a member pivotally connected to said frame on an axis inwardly of said first mentioned member and arranged to support it on said frame, means connected to one of said members for swinging said supporting member inwardly, whereby said load engaging and carrying member is raised and the upper end of its upright section is swung inwardly, a pair of brackets carried by said frame, shafts mounted in said brackets, rollers on said shafts forming guides for the lower end of said upright section, and a plate carried by said upright section and extending inwardly and slidably fitting between one side of one of said rollers and the opposing wall of the adjacent bracket to prevent lateral movement of the lower end of said upright section.

9. In apparatus of the class described, the combination with a frame and wheels for supporting said frame, of a tiltable load engaging and carrying member comprising an upright section and a supporting section, a link for supporting said member pivotally connected to said frame on an axis rearwardly of said member, means for swinging the upper end of said upright section inwardly, whereby said member is raised, a pair of brackets carried by said frame, shafts mounted in said brackets, rollers on said shafts forming guides for the lower end of said upright section, and a plate carried by said upright section and extending inwardly and slidably fitting between one side of one of said rollers and the opposing wall of the adjacent bracket, said plate being formed with an elongated slot through which the adjacent roller shaft extends and moves as the upright section is raised and lowered.

10. In apparatus of the class described, the combination with a frame and wheels for supporting said frame, of a tiltable load engaging and carrying member comprising an upright section having guides and means slidably engaging said guides for engaging and holding a load, a link pivotally connected at its lower end to said frame on an axis inwardly of said member and connected at its upper end to the upper portion of said upright section, whereby the latter is bodily raised and tilted when pulled inwardly, a pair of drums, means for driving either of said drums, a flexible member arranged to wind on and off one of said drums and operatively connected to said engaging and holding means, and a flexible member arranged to wind on and off the other drum and operatively connected to said upright section to effect a pull thereon.

In testimony whereof, I have hereunto subscribed my name.

EDWARD H. REMDE.